United States Patent
Merino Gonzalez et al.

[11] Patent Number: 5,267,316
[45] Date of Patent: Nov. 30, 1993

[54] SYNCHRONOUS SYSTEM FOR PARALLEL DATA SCRAMBLING

[75] Inventors: Jose L. Merino Gonzalez; Fernando Ortiz Saenz, both of Madrid; Rafael Burriel Luna; Fernando Ortega Rodriguez, both of Majadahonda; Ana Ma del Mar Menendez Martin, Madrid, all of Spain

[73] Assignee: Alcatel Standard Electrica S.A., Madrid, Spain

[21] Appl. No.: 953,085

[22] Filed: Sep. 29, 1992

[30] Foreign Application Priority Data

Sep. 30, 1991 [ES] Spain .................... 9102148

[51] Int. Cl.$^5$ .............................. H04K 1/00
[52] U.S. Cl. ..................... 380/28; 380/33; 380/48; 380/46; 364/717
[58] Field of Search ............ 380/28, 48, 49, 33, 380/42, 46; 364/717

[56] References Cited

U.S. PATENT DOCUMENTS

| | | | |
|---|---|---|---|
| Re. 30,957 | 6/1982 | Feistel | 380/28 X |
| 4,520,232 | 5/1985 | Wilson | 380/28 X |
| 4,965,881 | 10/1990 | Dilley | 380/46 X |
| 5,010,573 | 4/1991 | Musyck et al. | 380/28 |
| 5,031,129 | 7/1991 | Powell et al. | |
| 5,163,092 | 10/1992 | McNesby et al. | 380/28 |
| 5,185,799 | 2/1993 | McNesby et al. | 380/28 |

FOREIGN PATENT DOCUMENTS 0397079 11/1990 European Pat. Off. .

OTHER PUBLICATIONS

"Parallel Scrambling Techniques for Digital Multiplexers" by DooWhon Choi, published in the Sep./Oct. 1986 AT&T Technical Journal, vol. 65, Issue 5, pp. 123-136.

"1-Gwords Pseudorandom Word Generator" by William J. McFarland, et al, IEEE Journal of Solid-State Circuits, vol. 24, No. 3, Jun. 1989, pp. 747-751.

Primary Examiner—Tod R. Swann
Attorney, Agent, or Firm—Ware, Fressola, Van Der Sluys & Adolphson

[57] ABSTRACT

Of the type formed by a pseudorandom code generator and a block that performs the synchronizing and the scrambling in parallel which, in addition to the initialization signal, receives as inputs the set of parallel input data and the codes generated by the code generator, and produces the scrambled parallel data at the outputs; the modulo-2 adders used in the feedback loops of the pseudorandom code generator have only two inputs, and the outputs of the code generator in the parallel working time slots tp and tp+1 are related through the expression:

$$C_{tp+1} = T^n(n \times n) \cdot C_{tp}$$

simplifying the result accordingly.

3 Claims, 4 Drawing Sheets

SYNCHRONOUS SYSTEM FOR PARALLEL DATA SCRAMBLING

TECHNICAL FIELD

This invention, as stated in the title of this document, concerns a synchronous system for parallel data scrambling, of the type formed by a pseudorandom code generator, and a block for synchronizing and scrambling in parallel which, in addition to the initialization signal, receives as inputs the set of parallel input data and the codes generated by the pseudorandom code generator, and produces at its output the scrambled data in parallel.

This invention is preferrably applicable to high speed synchronous digital data transmission systems.

BACKGROUND TO THE INVENTION

In digital transmission systems, in order to prevent having long sequences of ones or zeros, it is normal to vary the binary pattern by means of a scrambler.

Scrambling used to be done serially, and this is why the CCITT Recommendation G.709 describes the functional diagram of a 7-bit series synchronous frame scrambler, as well as the polynomial for generating the pseudorandom code and the values of initialization of the corresponding scrambler.

Nevertheless, as the operating frequency of digital transmission systems grew, serial scrambling techniques were no longer applicable. For example, in high definition television transmission systems, it is necessary to work at 2.48 Gbit/s; with serial scrambling, this would mean working at frequencies of around 2.5 GHz, which is not feasible with silicon-based integrated circuits.

The problem of the working frequency could be resolved by using parallel scrambling techniques.

There are various publications in which such techniques for parallel scrambling are described. Specifically, in the article "Parallel scrambling techniques for digital multiplexers" by DooWhan Choi, published in the AT&T Technical Journal, Volume 65, No. 5, September/October 1986, a description of various methods for implementing this parallel scrambling is given.

A common characteristic of all well-known solutions to date, is that the number of inputs of the modulo-2 adders used in the feedback loops of the pseudorandom code generator is not 2 for every one of the modulo-2 additions.

This fact means that the operation of modulo-2 addition has to be carried out in various steps, and this involves two inconveniences that can become decisive.

On one hand, having to perform the modulo-2 addition in more than one step, leads to an increase in the processing delay (actually a multiplication by the number of steps), and this fixes the maximum working rate; or, in other words, for higher working rates, this solution is not valid. Secondly, to use more steps means using more logic gates with the resulting increase in the surface area of the integrated circuit used and, consequently, in the manufacturing cost.

DISCLOSURE OF INVENTION

An object of the present invention is to reduce the delay introduced in the generation of parallel pseudorandom codes, with the resulting increase in the maximum working rate.

According to the present invention each one of the modulo-2 adders used in the feedback loops of the pseudorandom code generator receives only two inputs.

In further accord with the present invention, the relationship between the outputs of the pseudorandom code generator in the time slots tp and tp+1 are determined by the expression:

$$C_{tp+1} = T^n(nxn) \cdot C_{tp},$$

where:

$C_{tp}$ is an n dimensional vector, equal to the number of bits in parallel that are scrambled, that indicates the value of the n pseudorandom codes in the parallel working time slot tp, $C_{tp+1}$ is an n dimensional vector, that indicates the value of the $n_n$ pseudorandom codes in the time slot tp+1, and T is the n-th power of the transformation matrix T, which is a square matrix (nxn) that represents the transformation matrix of the codes in accordance with the algorithm $1+X^6+X^7$, whose coefficients, in turn, depend on the value of n.

The basic advantages that present this way of generating parallel codes are:

a minimization of the feedback delay in the generation of the parallel pseudorandom codes, which is equivalent to increasing the maximum working rate;

a minimization of the number of logic gates to be used in generating the codes, with the consequent reduction in the surface area of the integrated circuit used and, consequently, in the manufacturing cost. These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
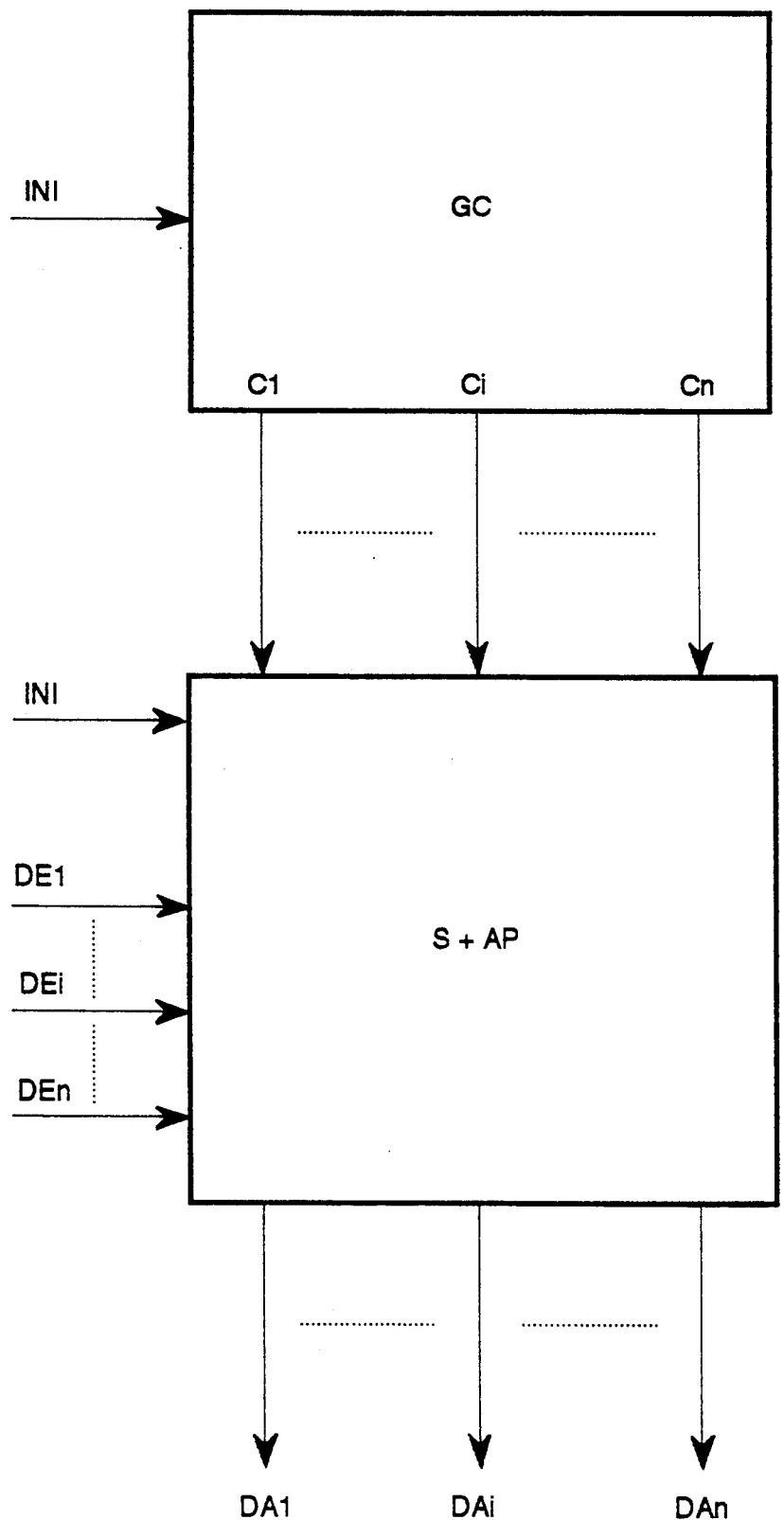
FIG. 1 shows a block diagram of a synchronous system for scrambling parallel data, in accordance with the invention.

As previously stated, in digital transmission systems, in order to avoid long sequences of ones or zeros, it is common to modify the binary pattern by the use of a scrambler.

In section 2.4 and in the FIG. 2-10/G.709 of the CCITT Recommendation G.709, the functional diagram is described of a 7-bit series synchronous frame scrambler in which the generating polynomial is $1+X^6+X^7$ and the values of initialization of the scrambler are 1 1 1 1 1 1 1

The output of the code generator that forms part of the scrambler previously mentioned can be represented as a matrix and in a generic form by:

$$C_{ts+1} = T \cdot C_{ts},$$

where $C_{ts}$ represents the code vector, equal in size to the number of working bits in the serial working time slot ts, $C_{ts+1}$ represents the said code vector in the time slot ts+1, T is a square matrix (nxn) that represents the transformation of codes in the series scrambler with each clock pulse, and n represents the number of working bits (7 in the specific case of the scrambler defined in the Recommendation G.709 of the CCITT).

As the operating rate of digital transmission systems increases (for example, in the case of digital transmission of high definition television, the operating rate is 2.48 Gbit/s), serial scrambling techniques are no longer applicable.

In these cases, the possibility of doing the scrambling in parallel must be considered, thereby reducing the operating rate, which would then become attainable with the current techniques for manufacturing integrated circuits.

Nevertheless, one must not forget that we are still interested in employing the scrambling algorithm described in the Recommendation G.709 of the CCITT.

Our invention addresses this problem with the following steps:

1. Extension of the CCITT algorithm from 7 bits to n bits.
2. Transformation of the series scrambling process into a process of scrambling n bits in parallel, the operating rate being n times less.
3. Simplification of the resulting mathematical relationships, specific for each value of n, making the number of logic gates to be used in the process of code generation minimal.

Expressed mathematically, the extension of the series algorithm of the CCITT to n bits is defined by $C(i) = C(i-6) + C(i-7)$, where the symbol + represents modulo-2 addition, and the values of initialization of the scrambler are (LSB, ... , MSB)

... 1 0 0 0 0 0 0 1 0 0 0 0 0 0 1 1 1 1 1 1 1.

While making the transformation from the n-bit series scrambling process, to an n-bit parallel scrambling process, there is no interest in knowing the intermediate results of all the series codes produced by the code generator, only the codes that are generated every n time slots.

This can be represented by means of the expression $$C_{tp+1} = T^n(n \times n) \cdot C_{tp},$$

where:

$C_{tp}$ is an n dimensional vector, that indicates the value of the n codes in the parallel working time slot tp, $C_{tp+1}$ is an n dimensional vector, that indicates the value of the n pseudorandom codes in the time slot tp+1, and $T^n$ is the n-th power of the transformation matrix T, which is a square matrix (nxn) that represents the transformation matrix of the codes in accordance with the algorithm $1 + X^6 + X^7$, and whose coefficients depend on the value of n.

Obtaining the mathematical relationships, as well as simplifying them, and subsequently applying them to obtain a code generator circuit, are described below for two specific values of the number n of working bits, n=16 and n=8. These values meet the majority of applications presently existing and foreseeable in the future, in order to make the scope of this invention more easily understood.

Thus, in the case n=16 bits, the matrix T(16×16) that satisfies the algorithm $1 + X^6 + X^7$ is:

$$T(16 \times 16) = \begin{vmatrix} 0 1 0 0 0 0 0 0 0 0 0 0 0 0 0 0 \\ 0 0 1 0 0 0 0 0 0 0 0 0 0 0 0 0 \\ 0 0 0 1 0 0 0 0 0 0 0 0 0 0 0 0 \\ 0 0 0 0 1 0 0 0 0 0 0 0 0 0 0 0 \\ 0 0 0 0 0 1 0 0 0 0 0 0 0 0 0 0 \\ 0 0 0 0 0 0 1 0 0 0 0 0 0 0 0 0 \\ 0 0 0 0 0 0 0 1 0 0 0 0 0 0 0 0 \\ 0 0 0 0 0 0 0 0 1 0 0 0 0 0 0 0 \\ 0 0 0 0 0 0 0 0 0 1 0 0 0 0 0 0 \\ 0 0 0 0 0 0 0 0 0 0 1 0 0 0 0 0 \\ 0 0 0 0 0 0 0 0 0 0 0 1 0 0 0 0 \\ 0 0 0 0 0 0 0 0 0 0 0 0 1 0 0 0 \\ 0 0 0 0 0 0 0 0 0 0 0 0 0 1 0 0 \\ 0 0 0 0 0 0 0 0 0 0 0 0 0 0 1 0 \\ 0 0 0 0 0 0 0 0 0 0 0 0 0 0 0 1 \\ 0 0 0 0 0 0 0 0 1 1 0 0 0 0 0 0 \end{vmatrix}$$

and the initialization values of the scrambler would be:

0 0 1 0 0 0 0 0 0 1 1 1 1 1 1 1

Making the necessary calculations, one obtains:

$$T^{16}(16 \times 16) = \begin{vmatrix} 0 0 0 0 0 0 0 0 1 1 0 0 0 0 0 0 \\ 0 0 0 0 0 0 0 0 0 1 1 0 0 0 0 0 \\ 0 0 0 0 0 0 0 0 0 0 1 1 0 0 0 0 \\ 0 0 0 0 0 0 0 0 0 0 0 1 1 0 0 0 \\ 0 0 0 0 0 0 0 0 0 0 0 0 1 1 0 0 \\ 0 0 0 0 0 0 0 0 0 0 0 0 0 1 1 0 \\ 0 0 0 0 0 0 0 0 0 0 0 0 0 0 1 1 \\ 0 0 0 0 0 0 0 0 1 1 0 0 0 0 0 1 \\ 0 0 0 0 0 0 0 0 1 0 1 0 0 0 0 0 \\ 0 0 0 0 0 0 0 0 0 1 0 1 0 0 0 0 \\ 0 0 0 0 0 0 0 0 0 0 1 0 1 0 0 0 \\ 0 0 0 0 0 0 0 0 0 0 0 1 0 1 0 0 \\ 0 0 0 0 0 0 0 0 0 0 0 0 1 0 1 0 \\ 0 0 0 0 0 0 0 0 0 0 0 0 0 1 0 1 \\ 0 0 0 0 0 0 0 0 1 1 0 0 0 0 1 0 \\ 0 0 0 0 0 0 0 0 0 1 1 0 0 0 0 1 \\ 0 0 0 0 0 0 0 0 1 1 1 1 0 0 0 0 \\ 0 0 0 0 0 0 0 0 0 1 1 1 1 0 0 \end{vmatrix}$$

and consequently, the relationship between the vectors that indicate the value of the codes in the time slots tp and tp+1 are given by:

$$\begin{vmatrix} C'1 \\ C'2 \\ C'3 \\ C'4 \\ C'5 \\ C'6 \\ C'7 \\ C'8 \\ C'9 \\ C'10 \\ C'11 \\ C'12 \\ C'13 \\ C'14 \\ C'15 \\ C'16 \end{vmatrix}_{tp+1} = \begin{vmatrix} 0 0 0 0 0 0 0 0 1 1 0 0 0 0 0 0 \\ 0 0 0 0 0 0 0 0 0 1 1 0 0 0 0 0 \\ 0 0 0 0 0 0 0 0 0 0 1 1 0 0 0 0 \\ 0 0 0 0 0 0 0 0 0 0 0 1 1 0 0 0 \\ 0 0 0 0 0 0 0 0 0 0 0 0 1 1 0 0 \\ 0 0 0 0 0 0 0 0 0 0 0 0 0 1 1 0 \\ 0 0 0 0 0 0 0 0 0 0 0 0 0 0 1 1 \\ 0 0 0 0 0 0 0 0 1 0 1 0 0 0 0 0 \\ 0 0 0 0 0 0 0 0 0 1 0 1 0 0 0 0 \\ 0 0 0 0 0 0 0 0 0 0 1 0 1 0 0 0 \\ 0 0 0 0 0 0 0 0 0 0 0 1 0 1 0 0 \\ 0 0 0 0 0 0 0 0 0 0 0 0 1 0 1 0 \\ 0 0 0 0 0 0 0 0 0 0 0 0 0 1 0 1 \\ 0 0 0 0 0 0 0 0 1 1 0 0 0 0 1 0 \\ 0 0 0 0 0 0 0 0 0 1 1 0 0 0 0 1 \\ 0 0 0 0 0 0 0 0 1 1 1 1 0 0 \end{vmatrix} \cdot \begin{vmatrix} C1 \\ C2 \\ C3 \\ C4 \\ C5 \\ C6 \\ C7 \\ C8 \\ C9 \\ C10 \\ C11 \\ C12 \\ C13 \\ C14 \\ C15 \\ C16 \end{vmatrix}_{tp}$$

Developing this matrix, the feedback equations are obtained in order to find the parallel pseudorandom code:

$C'1 = C10 + C11$ $C'2 = C11 + C12$ $C'3 = C12 + C13$ $C'4 = C13 + C14$ $C'5 = C14 + C15$ $C'6 = C15 + C16$ $C'7 = C10 + C11 + C16$ $C'8 = C10 + C12$ $C'9 = C11 + C13$ $C'10 = C12 + C14$ $C'11 = C13 + C15$ $C'12 = C14 + C16$ $C'13 = C10 + C11 + C15$ $C'14 = C11 + C12 + C16$ $C'15 = C10 + C11 + C12 + C13$ $C'16 = C11 + C12 + C13 + C14$ where the symbol + represents a modulo-2 addition.

It may be observed that the implementation of some of these equations, especially those corresponding to C'7, C'13, C'14, C'15 and C'16, requires modulo-2 operations with more than two inputs, therefore it would be interesting to simplify them until there were modulo-2 operations with only two inputs, if at all possible.

To simplify them, the relationship used is:

$C(i) = C(i-6) + C(i-7)$.

By applying this relationship to the equations above, one obtains:

$C'7 = C10 + C11 + C16 =$
$= C10 + C11 + C10 + C9 =$
$= C9 + C11.$

Similarly:

$C'13 = C10 + C11 + C15 =$
$= C4 + C3 + C5 + C4 + C9 + C8 =$
$= C4 + C3 + C5 + C4 + C3 + C2 + C2 + C9 =$
$= C1 + C5;$ $C'14 = C11 + C12 + C16 =$
$= C5 + C4 + C6 + C5 + C10 + C9 =$
$= C5 + C4 + C6 + C5 + C4 + C3 + C3 + C2 =$
$= C2 + C6;$ $C'15 = C10 + C11 + C12 + C13 =$
$= C4 + C3 + C5 + C4 + C6 + C5 + C7 + C6 =$
$= C3 + C7;$ $C'16 = C11 + C12 + C13 + C14 =$
$= C5 + C4 + C6 + C5 + C7 + C6 + C8 + C7 =$
$= C4 + C8;$ whereby one reaches expressions that permit the pseudorandom code generator to be implemented using modulo-2 operations with only two inputs each.

For the case of n=8 bits, the matrix $T(8 \times 8)$ that satisfies the algorithm $1 + X^6 + X^7$ must be:

$$T(8 \times 8) = \begin{vmatrix} 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 0 & 1 & 1 & 0 & 0 & 0 & 0 & 0 \end{vmatrix}$$

and the initialization values of the scrambler would be:

0 1 1 1 1 1 1 1

Making the appropriate calculations, one reaches:

$$T^8(8 \times 8) = \begin{vmatrix} 0 & 1 & 1 & 0 & 0 & 0 & 0 & 0 \\ 0 & 0 & 1 & 1 & 0 & 0 & 0 & 0 \\ 0 & 0 & 0 & 1 & 1 & 0 & 0 & 0 \\ 0 & 0 & 0 & 0 & 1 & 1 & 0 & 0 \\ 0 & 0 & 0 & 0 & 0 & 1 & 1 & 0 \\ 0 & 0 & 0 & 0 & 0 & 0 & 1 & 1 \\ 0 & 1 & 1 & 0 & 0 & 0 & 0 & 1 \\ 0 & 1 & 0 & 1 & 0 & 0 & 0 & 0 \end{vmatrix}$$

and consequently, the relationship between the vectors that indicate the value of the codes at the time slots tp and tp+1 is given by:

$$\begin{vmatrix} C''1 \\ C''2 \\ C''3 \\ C''4 \\ C''5 \\ C''6 \\ C''7 \\ C''8 \end{vmatrix}_{tp+1} = \begin{vmatrix} 0 & 1 & 1 & 0 & 0 & 0 & 0 & 0 \\ 0 & 0 & 1 & 1 & 0 & 0 & 0 & 0 \\ 0 & 0 & 0 & 1 & 1 & 0 & 0 & 0 \\ 0 & 0 & 0 & 0 & 1 & 1 & 0 & 0 \\ 0 & 0 & 0 & 0 & 0 & 1 & 1 & 0 \\ 0 & 0 & 0 & 0 & 0 & 0 & 1 & 1 \\ 0 & 1 & 1 & 0 & 0 & 0 & 0 & 1 \\ 0 & 1 & 0 & 1 & 0 & 0 & 0 & 0 \end{vmatrix} \cdot \begin{vmatrix} C1 \\ C2 \\ C3 \\ C4 \\ C5 \\ C6 \\ C7 \\ C8 \end{vmatrix}_{tp}$$

Developing this matrix, the feedback equations are obtained in order to find the parallel pseudorandom code:

$C''1 = C2 + C3$ $C''2 = C3 + C4$ $C''3 = C4 + C5$ $C''4 = C5 + C6$ $C''5 = C6 + C7$ $C''6 = C7 + C8$ $C''7 = C2 + C3 + C8$ $C''8 = C2 + C4$ where the symbol + represents a modulo-2 addition.

It can be seen that all these equations, with the exception of that corresponding to C''7, can be implemented with modulo-2 addition operations with only two inputs.

With regard to the expression corresponding to C"7, taking into account the relation C(i)=C(i−6)+C(i−7), it can be simplified to:

$$C''7 = C2 + C3 + C8 =$$
$$= C2 + C3 + C2 + C1 =$$
$$= C1 + C3;$$

which can then be implemented with a modulo-2 addition operation with only two inputs.

The practical implementation of the invention is shown in the FIGS. 1, 2a and 2b and 3.

FIG. 1 shows the functional block diagram of a generic synchronous system for scrambling data in parallel. It is formed by a code generator (GC) and a block (S+AP) that performs the synchronization and the scrambling in parallel.

This block, as well as the initialization signal INI, receives as inputs the set of parallel input data DE1, ..., DEi, ..., DEn and the codes generated by the code generator C1, ..., Ci, ..., Cn, and produces at its output the scrambled data DA1, ..., DAi, ..., DAn in parallel.

As has already been suggested, one aspect of the invention lies in how the codes C1, ..., Ci, ..., Cn are generated and another aspect in the claimed structure of the apparatus made possible thereby.

Figure 2A:
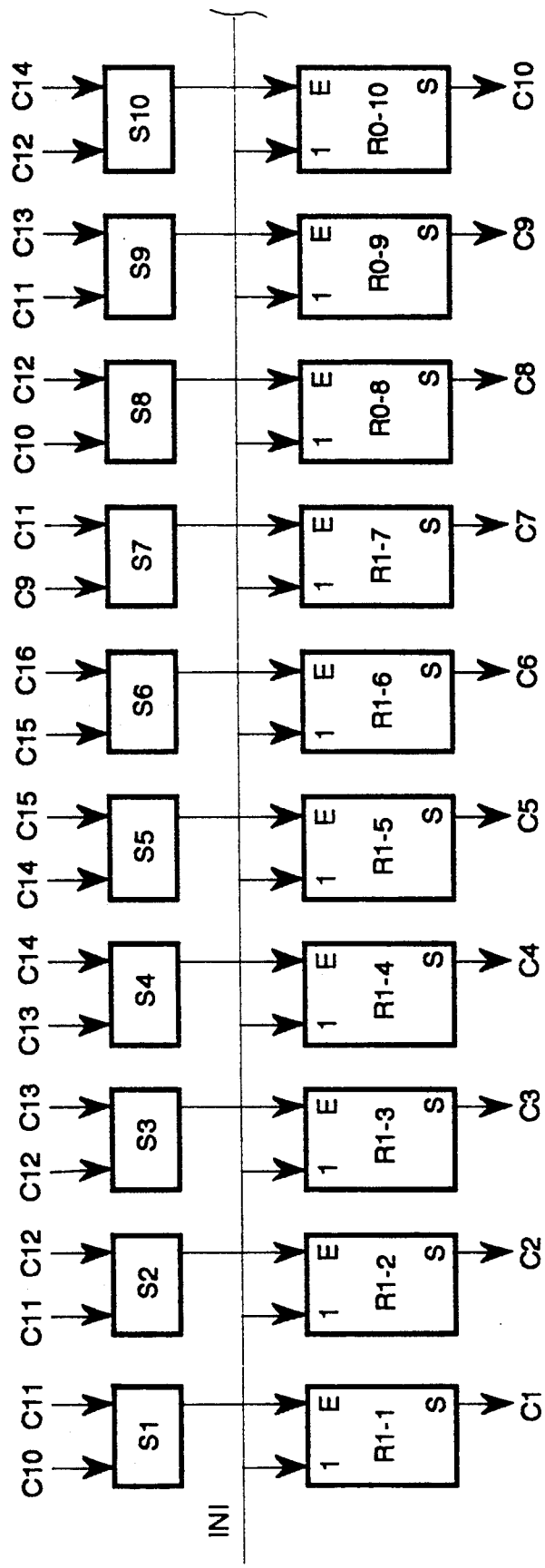
FIGS. 2a & 2b together show the synchronous code generator according to the invention, when working with 16 bits in parallel, in which it may be seen how all the codes are generated using, for each bit, a modulo-2 feedback with only two inputs.
Figure 2:
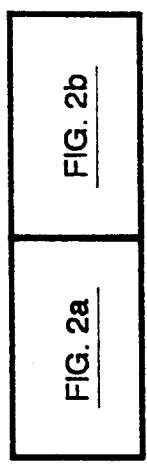
FIG. 2 shows the relation between FIGS. 2a and 2b.
Figure 2B:
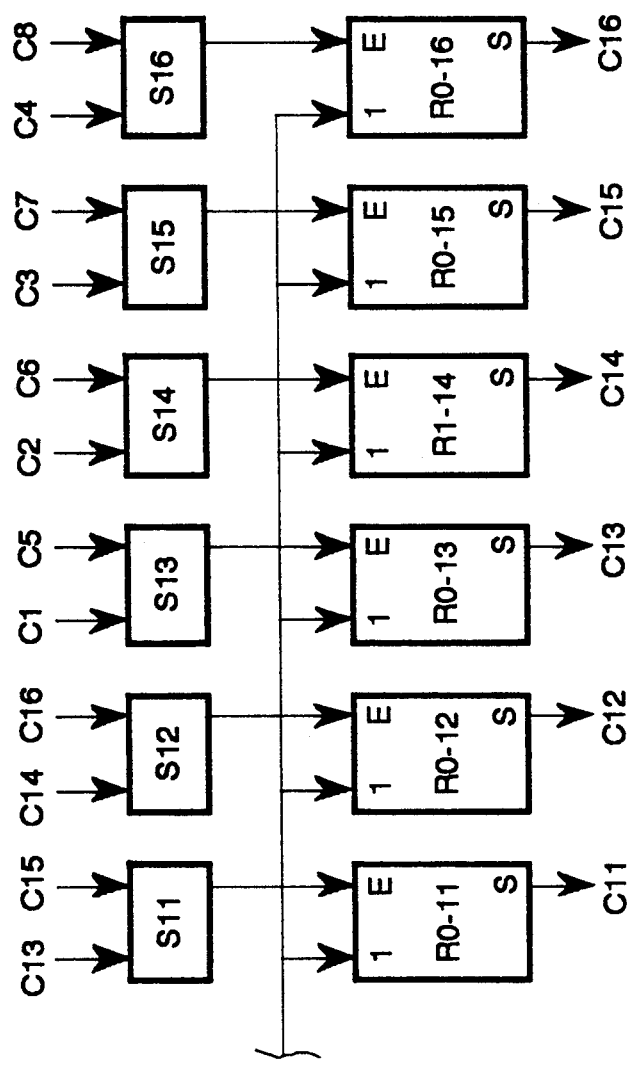

FIGS. 2a and 2b together show the schematic of the code generator for the case of working with 16 bits. It is formed by 16 modulo-2 adders, termed S1, ..., Si, ..., S16, each one of which has only two inputs, in accordance with the characteristics of the invention, and by 16 delay blocks, all identical to each other except insofar as the initialization value is concerned, and which are referred to as R1−i when the initialization value is '1' and R0−i when the initialization value is '0'.

The inputs of the modulo-2 adders, as can be seen, satisfy the mathematical relationships necessary so that, when the feedback takes place, the algorithm of Recommendation G.709 of CCITT is still complied with at the output Ci.

Figure 3:
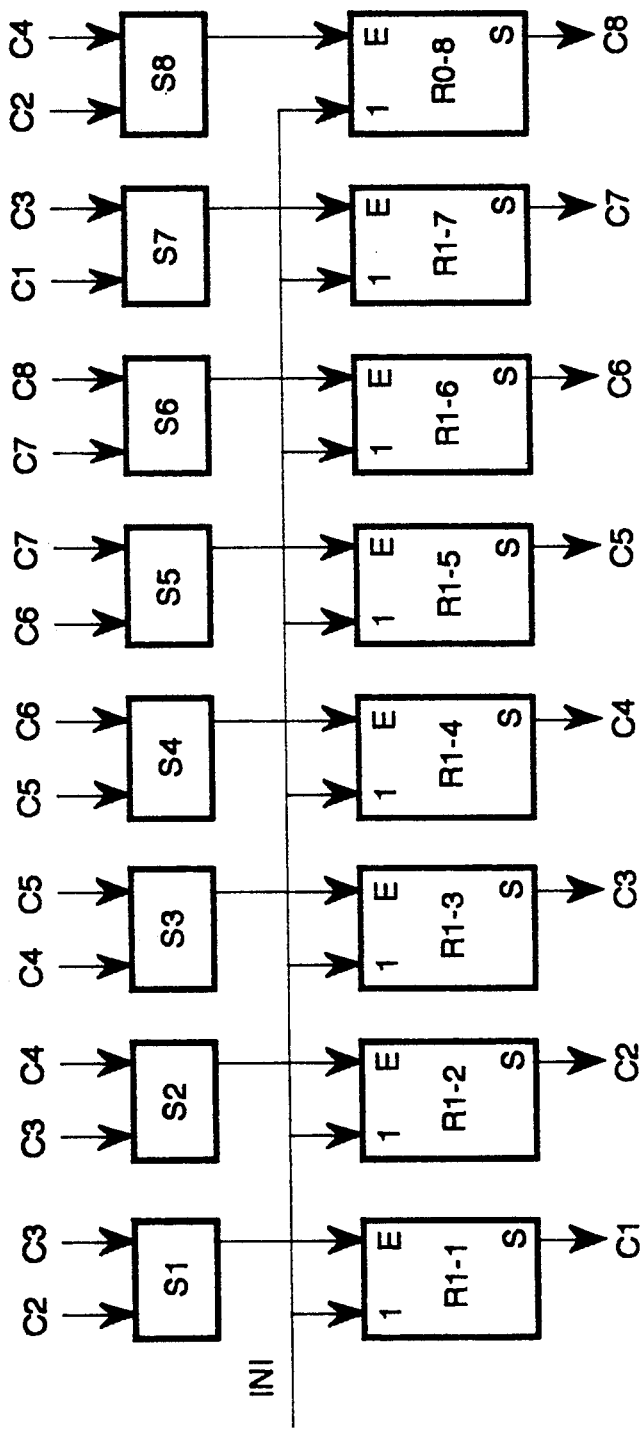
FIG. 3 shows the synchronous code generator according to the invention, when working with 8 bits in parallel; here also it may be seen how all the codes are generated using, for each bit, a modulo-2 feedback with only two inputs.

In FIG. 3, the schematic of the code generator for the case of working with 8 bits is shown. Everything mentioned in relation with FIG. 2 is applicable also to this FIG. 3.

Although the invention has been shown and described with respect to an exemplary embodiment thereof, it should be understood that the foregoing and other changes, omissions and additions may be made therein without departing from the spirit and scope of the invention.

We claim:

1. An improved synchronous system for parallel data scrambling, of the type comprising a pseudorandom code generator (GC) and a block (S+AP) that performs the synchronizing and scrambling in parallel which, in addition to an initialization signal (INI), receives as inputs a set of parallel input data (DE1, ..., DEi, ..., DEn) and codes (C1, ..., Ci, ..., Cn) generated by the code generator and produces at its output scrambled data (DA1, ..., DAi, ..., DAn) in parallel and wherein the improvement is that each one of a plurality of modulo-2 adders used in feedback loops of the pseudorandom code generator receives only two inputs; and the relationship between the outputs of the pseudorandom code generator in two consecutive time slots of parallel operation tp and tp+1 are determined by an expression:

$$C_{tp+1} = T^n(n \times n) \cdot C_{tp}$$

where:

$C_{tp}$ is an n dimensional vector, equal to a number of bits in parallel that are scrambled, that indicates a value of n pseudorandom codes in the parallel working time slot tp, $C_{tp+1}$ is an n dimensional vector, that indicates a value of n pseudorandom codes in the time slot tp+1, $T^n$ is an n-th power of a transformation matrix T, which is a square matrix (nxn) that represents a transformation matrix of the codes in accordance with the algorithm $1+X^6+X^7$, whose coefficients, in turn, depend on the value of n.

2. Synchronous system for parallel data scrambling according to claim 1, wherein the system is further improved in that the relationship between the outputs of the pseudorandom code generator in the time slots tp and tp+1, when the number of bits to be scrambled in parallel is 16, is given by:

$$C'1 = C10 + C11$$

$$C'2 = C11 + C12$$

$$C'3 = C12 + C13$$

$$C'4 = C13 + C14$$

$$C'5 = C14 + C15$$

$$C'6 = C15 + C16$$

$$C'7 = C9 + C11$$

$$C'8 = C10 + C12$$

$$C'9 = C11 + C13$$

$$C'10 = C12 + C14$$

$$C'11 = C13 + C15$$

$$C'12 = C14 + C16$$

$$C'13 = C1 + C5$$

$$C'14 = C2 + C6$$

$$C'15 = C3 + C7$$

$$C'16 = C4 + C8$$

where the symbol + represents a modulo-2 addition.

3. Synchronous system for parallel data scrambling according to claim 1, wherein the system is further improved in that the relationship between the outputs of the pseudorandom code generator in the time slots tp and tp+1, when the number of bits to be scrambled in parallel is 8, is given by:

$$C''1 = C2 + C3$$

$$C''2 = C3 + C4$$

$$C''3 = C4 + C5$$

$$C''4 = C5 + C6$$

$$C''5 = C6 + C7$$

$C''6 = C7 + C8$ $C''7 = C1 + C3$ $C''8 = C2 + C4$ where the symbol + represents a modulo-2 addition.

* * * * *